(12) United States Patent
Giraud et al.

(10) Patent No.: US 8,926,301 B2
(45) Date of Patent: Jan. 6, 2015

(54) APPLIANCE FOR LOCALIZED HEATING OF A POLYMER MATERIAL SURFACE TO BE REPAIRED BY BLOWING A HOT FLUID INSIDE A CONFINEMENT CHAMBER

(71) Applicant: Eurocopter, Marignane, Cedex (FR)

(72) Inventors: Kevin Giraud, Salon de Provence (FR); Nicolas Capelle, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 75 days.

(21) Appl. No.: 13/676,341

(22) Filed: Nov. 14, 2012

(65) Prior Publication Data

US 2013/0127081 A1    May 23, 2013

(30) Foreign Application Priority Data

Nov. 17, 2011  (FR) ...................................... 11 03494

(51) Int. Cl.
*B29C 35/04* (2006.01)
*B29C 73/32* (2006.01)
*B29C 73/34* (2006.01)

(52) U.S. Cl.
CPC ................. *B29C 35/04* (2013.01); *B29C 73/32* (2013.01); *B29C 73/34* (2013.01); *B29C 35/045* (2013.01); *B29C 35/049* (2013.01)
USPC .......................................................... 425/14

(58) Field of Classification Search
CPC ................................. B29C 73/32; B29C 73/34
USPC .......................................................... 425/14
See application file for complete search history.

(56) References Cited

U.S. PATENT DOCUMENTS

| 4,652,319 | A | | 3/1987 | Hammond |
| 6,149,749 | A | * | 11/2000 | McBroom ....................... 156/94 |
| 2010/0136232 | A1 | | 6/2010 | Walker |
| 2011/0232829 | A1 | | 9/2011 | Cacace |

FOREIGN PATENT DOCUMENTS

| DE | 202009007118 U1 | 10/2010 |
| EP | 2371523 A1 | 10/2011 |
| FR | 2950079 A1 | 3/2011 |
| WO | 2008119114 A1 | 10/2008 |

OTHER PUBLICATIONS

Search Report and Written Opinion; Application No. FR 1103494; dated Jul. 4, 2012.
European Search Report Dated Feb. 22, 2013, Application No. EP 12 00 7528, 5 Pages.

* cited by examiner

*Primary Examiner* — Yogendra Gupta
*Assistant Examiner* — Kimberly A Stewart
(74) *Attorney, Agent, or Firm* — Brooks Kushman P.C.

(57) ABSTRACT

The invention provides an appliance for localized heating of a polymer material surface to be repaired by blowing a hot fluid inside a confinement chamber (2) that is defined by a deformable cap (1). The cap (1) is made of a blanket (6) incorporating a framework (7) for shaping the confinement chamber (2) under the effect of tensions applied locally by the framework (7) to the blanket (6) in its general plane (P). Force generator means (9) cause the framework (7) to change between a flexible state in which the framework (7) is arranged in the general plane of the blanket (6), and a rigid state for shaping the confinement chamber (2). The force generator means (9) comprise a force generator source that produces a suction, and the framework (7) is made up of strips of felt (8, 8') housed in a pouch of the blanket (6).

20 Claims, 2 Drawing Sheets

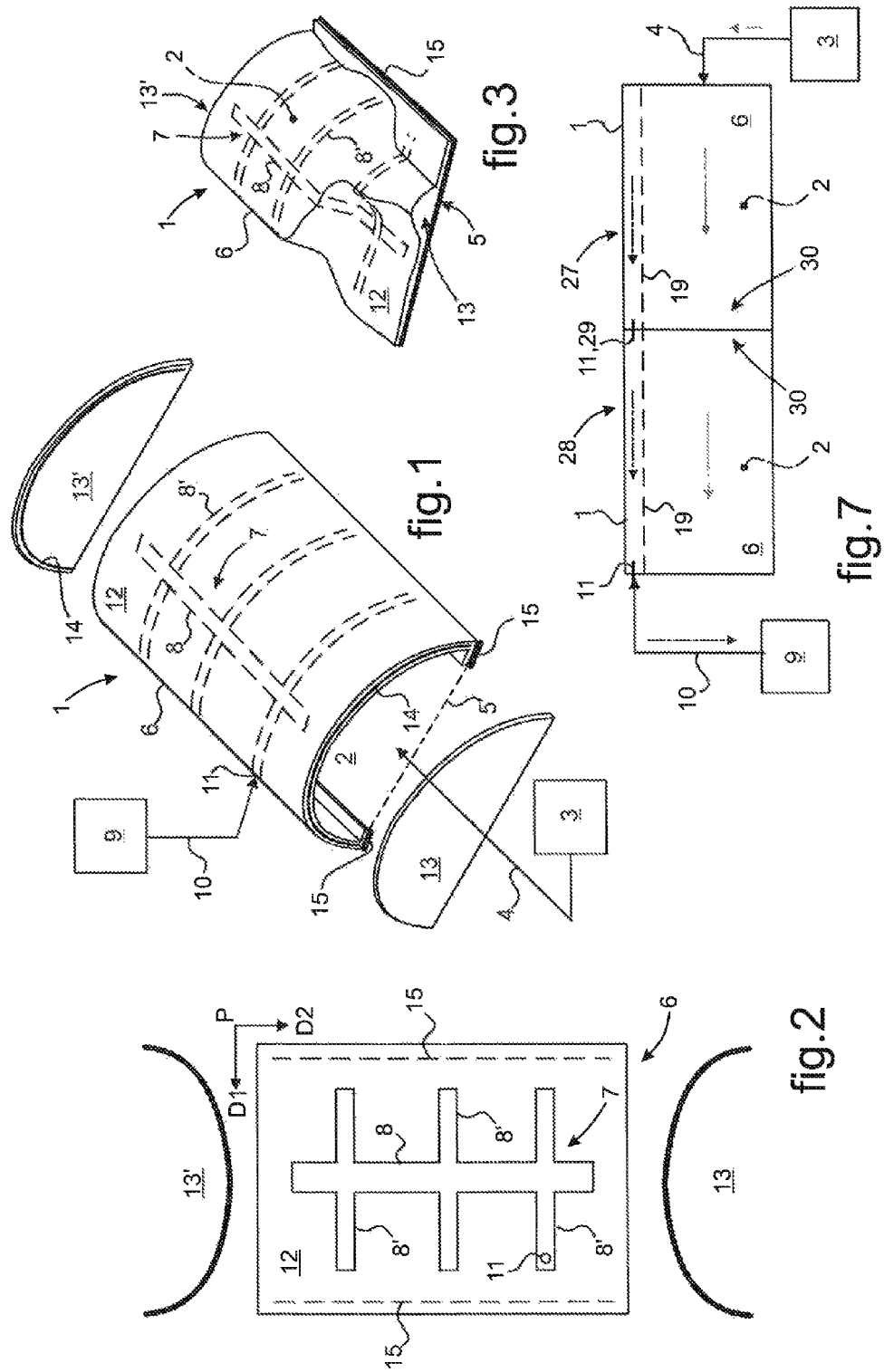

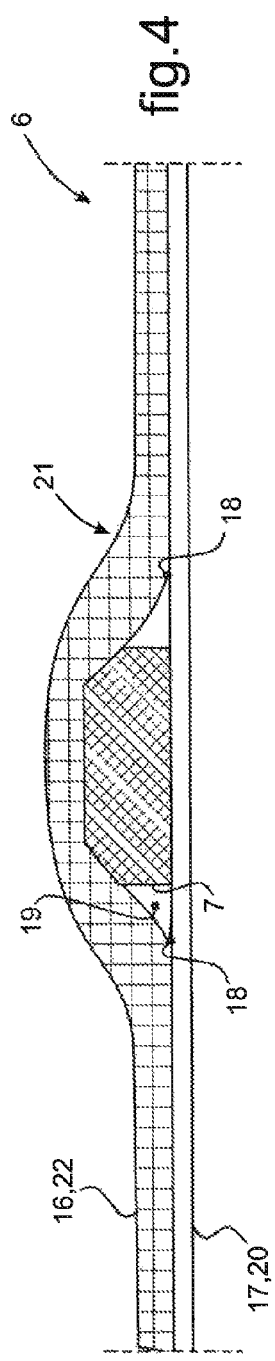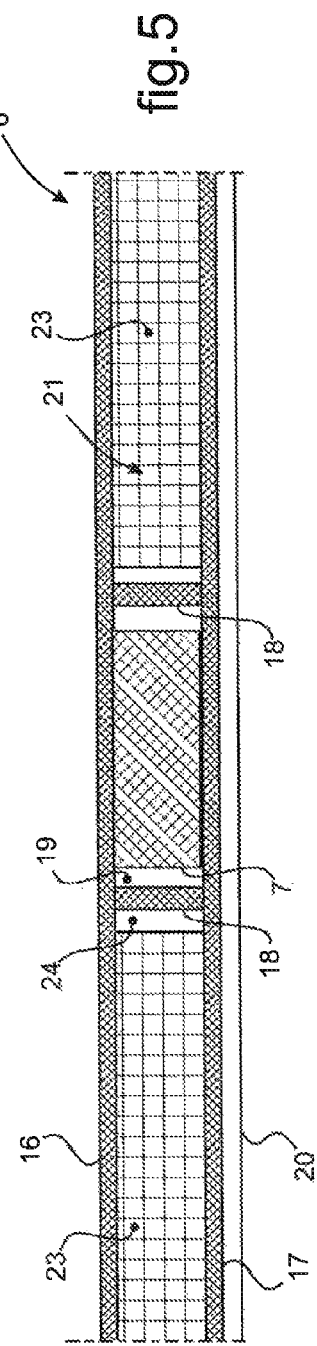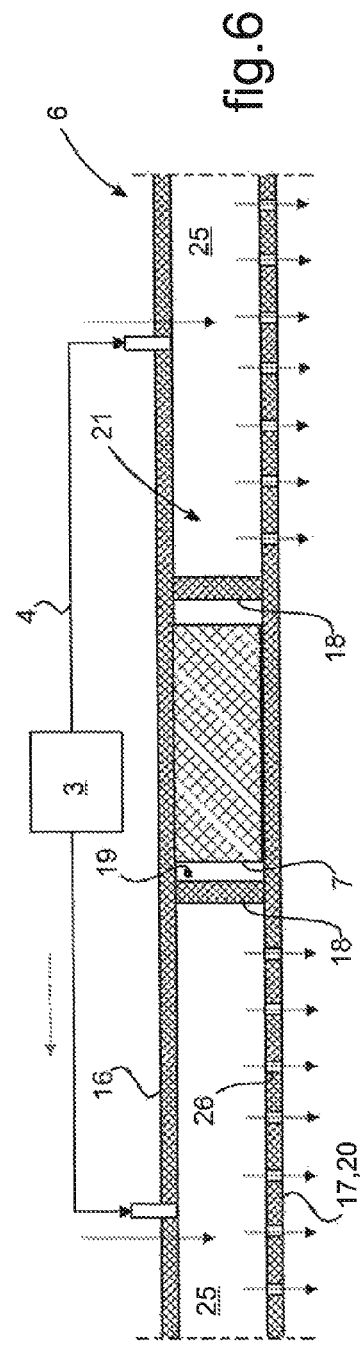

APPLIANCE FOR LOCALIZED HEATING OF A POLYMER MATERIAL SURFACE TO BE REPAIRED BY BLOWING A HOT FLUID INSIDE A CONFINEMENT CHAMBER

CROSS REFERENCE TO RELATED APPLICATIONS

This application claims priority to French patent application FR 11/03494 filed on Nov. 17, 2011, the disclosure of which is incorporated in its entirety by reference herein.

BACKGROUND OF THE INVENTION (1) Field of the Invention

The present invention lies in the field of processing plastics materials, and more particularly the field of appliances used for locally repairing a surface made of organic polymer material. The present invention relates more specifically to appliances for locally heating a polymer material surface by confining a zone for treatment and by heating said zone for treatment by blowing a hot fluid, in particular air or steam.

The present invention provides such an appliance for localized heating of a polymer material surface to be repaired, which appliance comprises a deformable cap that forms a confinement chamber for confining the zone for treatment and means for blowing the hot fluid inside the confinement chamber.

(2) Description of Related Art

In the field of processing plastics materials, it is known to use a transportable appliance to make a localized repair to a surface made of a polymer material, in particular an organic polymer material. The appliance comprises a confinement chamber for confining a zone for treatment of the surface to be repaired, and means for blowing a hot fluid inside the chamber in order to raise the temperature of the zone for treatment. Such appliances are advantageously easily transported so as to enable them to be taken to a structure of large volume including a surface to be repaired that is treated locally over a zone of restricted extent.

More particularly, such appliances are known in which the confinement chamber is provided by a deformable cap defining an opening of the confinement chamber leading to outside the cap. The confinement chamber forms a volume that is interposed between the zone for treatment and the cap, with the outlet of the cap being for application around the zone for treatment.

By way of example, reference may be made to documents U.S. Pat. No. 4,652,319 (Hammond R. E.) and WO 2008/119114 (Ind. Composites Engineering et al.), which describe such appliances.

A general problem to be solved lies in the arrangement of the cap. A compromise needs to be found between various difficulties to be overcome and/or advantages to be obtained.

Any escape of hot fluid blown inside the confinement chamber should be avoided in order to limit energy losses while heating the zone for treatment and in order to ensure that the confinement chamber is maintained uniformly at an appropriate temperature. The surface to be repaired may be of a shape that is complex, making it difficult to install the cap in peripheral contact at its outlet along the outline of the zone for treatment. The shape of the outlet of the cap needs to be adapted to match the shape of the surface to be repaired so as to procure satisfactory confinement of the zone for treatment. The deformable nature of the outlet of the cap must make it easy to vary the shape of the confinement chamber at its outlet, with the periphery of said outlet needing to be as close as possible a fit to the shape of the outline of the zone for treatment.

For a given volume of the confinement chamber, it is appropriate for the deformable nature of the cap to enable it to be adapted easily to the shape of the outline of the zone for treatment, regardless of the shape of the surface to be repaired. It is desired to optimize the profitability of the appliance by organizing the cap in such a manner as to minimize costs while optimizing the suitability of the cap for use in repairing any surface that is to be repaired.

It is also appropriate to take advantage of the deformable nature of the cap to make the appliance easier to handle, to transport, and to stow. Installing the cap on the surface to be repaired, and removing it therefrom need to be achieved as quickly and as easily as possible.

It is advantageous for the chamber to be thermally insulated so as to avoid losing energy by transferring heat from the confinement chamber to the external surroundings. The overall shape of the cap, defining the volume of the confinement chamber, enables the confinement chamber to be ventilated uniformly. It is appropriate for the means providing thermal insulation of the confinement chamber not to impede its deformability, in particular relative to the facility of stowing and transporting the appliance easily, and more particularly its cap. The thermal insulation of the confinement chamber must be obtained efficiently while limiting the cost of obtaining the appliance.

In U.S. Pat. No. 4,652,319 and WO 2008/119114, the blower means are used to adapt the shape of the cap to the surface that is to be repaired.

For example, in U.S. Pat. No. 4,652,319, the cap comprises a rigid bell carrying a skirt arranged as a bellows at the periphery of its outlet. The skirt provides a deformable outlet for the cap that is applied against the surface to be repaired. The outlet from the cap is pressed against the surface to be repaired at the periphery of the zone for treatment, by establishing suction inside the confinement chamber. Such suction causes the cap to be deformed along its elevation axis between a resting station in which the development of the cap is optimized in elevation, and a working station in which the cap is partially compacted by compressing the bellows.

Also by way of example, according to WO 2008/119114, the cap is made up of two deformable layers that are assembled together. A first layer that is generally plane is designed to be pressed against the surface to be repaired, at the periphery of the zone for treatment. A second layer, defining the volume of the confinement chamber, is bonded to the periphery of the first layer and is shaped by blowing in the hot fluid that flows between the two layers.

Proposals are also made in document EP 2 371 523 (Aliena Aeronautica SPA) for an appliance for locally heating a polymer material surface to be repaired that is potentially complex in shape. More particularly, that document proposes confining a heating layer between the surface to be repaired and a membrane held pressed against the surface to be repaired. The membrane is pressed by establishing suction in the space between the membrane and the surface to be repaired, and by thrust exerted against the membrane by the air admitted under pressure into a chamber placed over the membrane. The chamber is defined by a concave body having an outlet that is closed by the membrane. The concave body is dome-shaped, being made of a resin wall with reinforcement embedded in the wall to hold the concave body in shape against the thrust exerted on the wall by the air admitted under pressure into the inside of the chamber cap.

The present invention provides an appliance for localized heating of a polymer material surface to be repaired, in particular a surface made of an organic polymer material. The appliance is more specifically of the type comprising a deformable cap that provides a confinement chamber for a zone for treatment of the surface to be repaired, together with blower means for blowing a hot fluid, e.g. air or steam, inside the confinement chamber.

BRIEF SUMMARY OF THE INVENTION

The object of the present invention is to propose such an appliance comprising a cap organized in such a manner as to obtain a satisfactory compromise with respect to the above-mentioned constraints and advantages to be obtained.

The appliance of the present invention is an appliance for localized heating of a polymer material surface to be repaired, in particular a surface of organic polymer material. Heating is performed by blowing a hot fluid into the inside of a confinement chamber of the appliance for confining the zone for treatment. By way of example, the fluid is hot air or steam, or any other fluid suitable for raising a zone for treatment of the surface to be repaired to a desired temperature for a determined duration.

The appliance comprises at least one deformable cap forming the confinement chamber and providing at least one outlet from the confinement chamber towards the outside of the cap. The cap is for placing over the zone for treatment, while defining the confinement chamber with its outlet arranged around the zone for treatment.

The cap is a member defining a volume around the zone for treatment, with gas-flow communication between the zone for treatment and said volume being provided via the outlet of the confinement chamber towards the outside of the cap. The volume defined by the cap corresponds to the confinement chamber, which volume extends along a general transverse elevation axis, in particular an axis that is perpendicular to the general plane in which its outlet extends when the cap is in its resting station.

The cap is in gas-flow communication with a blower source for blowing a raised temperature fluid, in particular via a first gas-flow circuit. Such gas-flow communication may be obtained using specific means for connecting the cap with the first gas-flow circuit. Advantage may be taken of the cap being deformed at the outlet of the confinement chamber to provide a passage for a duct forming part of the first gas-flow circuit so that it passes from the outside to the inside of the confinement chamber.

The cap is deformable between two stations. The deformability of the cap should be considered relative to a variation of its shape when it is subjected to stress, and more particularly with regard to variation of the shape desired for the outlet of the confinement chamber towards the outside. Such variations in shape under stress of the cap give said outlet the ability to deform while being pressed against the surface to be repaired, and more particularly pressed against the outline of the zone for treatment.

The deformability of the outlet provides the cap with the facility of being a fit to the outline of the zone for treatment, especially when such an outline is of complex shape and/or presents variations of shape relative to a general plane in which the surface to be repaired, and more particularly the zone for treatment, extends. The complex shape of the outline of the zone for treatment should be considered as presenting variations of shape relative to a plane extending transversely to the elevation axis of the confinement chamber.

The said two stations of the cap correspond respectively to a resting station and to a working station.

The resting station of the cap is a natural station in which the cap has a spontaneous shape. The concept of the station being "natural" should be considered as designating the intrinsic state of a body, and in particular a state of the body without external stresses being applied thereto, other than gravity, where applicable.

The working station of the cap corresponds to the state of the cap in which the cap defines the volume of the confinement chamber. In the working station, the cap is put under stress by selective use of force generator means forming part of the appliance. The force generator means are used selectively by an operator, using control means in particular, causing the force generator means to vary between an inactive state and an activated state. In the inactive state, the force generator means do not generate said force; conversely, in the activated state, the force generator means generate said force.

The appliance of the present invention is mainly recognizable in that the cap is constituted by a generally plane blanket incorporating in its general plane a framework for shaping the confinement chamber. The blanket is deformable by the framework between a natural passive state and a deformed state of the blanket. In the natural passive state, the blanket is plane; in the deformed active state, the blanket is deformed by the framework in its general plane causing the confinement chamber to be shaped under the effect of tensions that are applied locally by the framework to the blanket in its general plane.

The framework also changes state between a passive state and an active state. In the passive state, the blanket and the framework incorporated therein are spontaneously plane in the natural state. In the active state, the framework is subjected to deformation by said force generator means and it applies said local tensions to the blanket.

The framework constitutes an intermediate member between the cap-forming blanket and the force generator means used for placing the cap in its working station. Stress applied to the framework by the force generator means is transferred locally by the framework to the blanket, giving rise to overall deformation of the blanket in its general plane. The overall deformation of the blanket causes the confinement chamber to be shaped from a naturally plane state of the cap in its resting station to a state in which volume is developed along the elevation axis of the cap in the working station. The overall deformation of the blanket in the working station of the cap is induced indirectly by means of the framework being subjected to stress by the force generator means.

The blanket is constituted in particular by a leak-proof sheet member or the like comprising at least one layer. The blanket may comprise a plurality of superposed layers that are secured to one another, each layer being made up of a respective generally-plane individual sheet. Said superposed individual sheets make up the sheet member, with crumpling deformation of the blanket leading to corresponding deformation of the layers that make it up. Such deformation corresponds in particular to the confinement chamber being shaped by causing the blanket to go from a natural state with the cap in its resting station, to a deformed state with the cap in its working station in which the confinement chamber is shaped.

Deformation of the blanket may also correspond to folding it in half and/or rolling it up for transport or stowage purposes. The ability of the blanket to be in a plane and flexible state while the cap is in its resting station, enables the cap to be folded or rolled up in this way while it is in the resting state.

By way of example, said layers are individual sheet members forming covers that are superposed and joined together. Said layers can perform respective functions, such as a thermally insulating layer and/or a heat reflecting layer. Where appropriate, the layers should be considered as forming a whole making up the blanket by the layers being superposed and securely bonded to one another, the layers being deformable together in their general plane under the effect of the blanket deforming.

The sheet member gives the blanket its nature of being plane and deformable in its general plane. The cap is made up of the blanket that includes the framework in its general plane, the blanket and the framework incorporated therein being deformable between the generally plane natural state of the blanket and of the framework incorporated therein, and the deformed state in which the blanket is deformed under the effect of stresses applied locally in its general plane via the framework being subjected to stress by the force generator means, in order to shape the confinement chamber.

The framework is incorporated in the blanket so as to extend across the general plane of the blanket in the natural state, as defined by the two co-operating directions in three-dimensional space in which the blanket mainly extends.

The term "incorporated" when applied to the framework in the blanket should be understood as the framework being securely bonded to the blanket in its general plane, the framework extending in the general plane of the blanket in the two directions that define the general plane of the blanket. Incorporating the framework in the blanket involves them being mutually engaged in anchor zones where the framework is anchored to the blanket, which zones are distributed in the general plane of the blanket. Said localized tensions are applied by the framework to the blanket in its general plane via the anchor zones.

The structure of the cap is simple and inexpensive, comprising no more than the blanket incorporating the framework.

For a given perimeter of the blanket, the cap may be adapted depending on requirements to forming a confinement chamber around zones for treatment having a variety of shapes and sizes. The outlet of the confinement chamber is suitable for being fitted easily to any shape of surface to be repaired. The shaping of the confinement chamber by applying said localized tensions to the blanket by means of the framework enables the outlet of the confinement chamber to be deformed freely in reaction to the blanket being pressed against the surface to be repaired at the margins of the outlet. The outlet can be deformed freely in all three dimensions of three-dimensional space.

The outlet of the confinement chamber is defined by the margin of the blanket, possibly folded over by an operator in order to match the shape of the outlet of the confinement chamber as closely as possible to a specific shape of the outline of the zone for treatment.

The cap is easily transportable and may be stowed in a small space, by folding the blanket or analogously by rolling it up.

The blanket may easily be fitted with gas-flow connection members for establishing communication between the framework and the hot fluid generator source, or indeed for establishing communication between the framework and a force generator source that produces a suction, as described below.

The shape and the extent of the framework in the general plane of the blanket determine the shaping of the confinement chamber formed by the blanket when subjected to deformation by said localized tensions. The shape and the extent of the framework can easily be adapted to any shape that might be desired for the confinement chamber that is to be obtained.

Incorporating the framework in the blanket makes it easy to reduce the volume of the confinement chamber to a volume that is just sufficient so as to limit the volume of hot fluid that needs to be used. For a given framework, the volume of the confinement chamber may be adjusted depending on the force developed by said tensions applied by the framework to the blanket. The force developed by said tensions can be adjusted by adjusting the force generator means. The rise of the confinement chamber may be varied considerably depending on requirements from a small value corresponding to a deformation of the blanket that is close to its natural state, up to an optimized elevation for the confinement chamber.

More particularly, the framework is flexible in the passive state and is stiffened in the active state by the force generator means that induce a change of state in the framework between its passive state and its active state. The shape of the framework is changed at least relative to the general plane in which it extends in the passive state, which corresponds to its natural state. The general plane in which the framework extends in the passive state corresponds to the general plane of the blanket in the natural state.

Change to the shape of the framework induced by the force generator means advantageously takes place progressively between the passive state and an optimized active state in which the framework is rigid. The term "rigid" is used to mean a state of the framework in which the framework is spontaneously not deformable, naturally maintaining its shape at least against the effect of gravity, and in particular also against the effects of forces induced by blowing the hot fluid inside the cap.

In a state of the framework that is intermediate between the passive state and the optimum active state, the framework is semi-rigid and malleable. In the intermediate state, the framework naturally opposes any bending in the general plane in which it extends while the framework is in the passive state.

For a blanket of given area and/or shape, an operator can bend the framework in various ways while the framework is in the intermediate state. Such bending of the framework allows an operator to match the shape of the framework to requirements, and more specifically to match the shape of the confinement chamber as a function of the zone for treatment, both in terms of the overall volume of the confinement chamber and in terms of specific shaping of its outlet.

In a particular embodiment, the framework is housed inside at least one closed pouch formed in the blanket. The framework is made up of at least one tension element made of a body of cellular material having intercommunicating open cells. The force generator means are for generating suction inside the pouch.

The tension element is in particular of elongate shape, so as to apply said localized tensions to the blanket depending on the orientation and the shape of the elongate element within the blanket. Applying suction to the pouch and to the tension elements causes the framework to be stiffer by being compacted as a result of compressing the cells making up the material from which the tension element is made.

The appliance includes a second gas-flow circuit for applying suction to the pouch housing the framework. The pouch may be fitted with a valve or an analogous member for connecting the blanket to the second gas-flow circuit, so as to allow the blanket to be separated from the force generator source producing the suction. The force generator means are simple in structure, inexpensive, reliable, and easily transportable, and they are usable with a variety of caps of respective appliances. The second gas-flow circuit is distinct from the blanket and occupies a volume outside the confinement chamber. Occupation of volume inside the confinement chamber is avoided, and it is possible to separate the blanket from the force generator source that produces the suction.

The structure of the framework is simple and inexpensive, and the shaping of the framework is easily adaptable depending on the size and the orientation within the general plane of the blanket of one or more of the tension elements making up the framework. The confinement chamber can rapidly be shaped in accordance with requirements. The shaping of the confinement chamber may be adapted on site by making use of the malleable nature of the framework as it becomes compacted under the effect of the suction that is established progressively inside the pouch.

For example, the ends of the framework may voluntarily be deformed by an operator while the framework is in an intermediate state so that they are applied against the surface to be repaired at the margin of the zone for treatment. The shaping of the confinement chamber is easily adaptable depending on requirements for given shape of the blanket in its general plane. Such adaptation is advantageous for adapting the shape of the confinement chamber to the shape of the zone for treatment, with the volume of the confinement chamber advantageously being reduced so as to limit the volume of hot fluid that needs to be used for a given repair of the surface to be repaired. The shape of the outlet of the confinement chamber is easily adapted to match the potentially arbitrary shape of the outline of the zone for treatment, by localized deformation of the framework undertaken by an operator while the framework is in its state of intermediate stiffness.

The blanket may include a plurality of pouches, with it being possible for an operator to select which pouches are to receive tension elements as a function of requirements, and more particularly depending on the configuration of the zone for treatment. For example, the overall organization of the framework may be established by an operator on site by using various tension elements that are housed selectively inside one or more pouches selected by the operator.

A given blanket may be used for zones for treatment that are of different shapes, by adjusting the shape and the volume of the confinement chamber to that which is just sufficient depending on the arrangement of the zone for treatment. Such an adjustment of the shape and the volume of the confinement chamber can be performed by making selective use of the pouches included in the blanket, and/or by taking advantage of the malleable nature of the framework in an intermediate state depending on the suction that is progressively generated inside the pouch(es) by the force generator source that produces a suction.

For example, the tension element is made from a strip of felt having fibers that form said cells between them. The framework made from one or more such strips is inexpensive, and can easily be organized depending on requirements.

In particular, the framework is made up of a plurality of co-operating elongate tension elements, each extending across the blanket between at least two opposite edges thereof. The elongate tension elements making up the framework may be housed in a common pouch, or they may be housed pouches that are allocated respectively thereto on an individual basis or in groups of tension elements. A desired shape for the framework is easily obtained from the strips of felt that make up the tension elements.

In an advantageous embodiment enabling pouches to be formed at low cost, the blanket is made up of at least two covers that are superposed in their general plane and fastened together. The covers may be fastened together by means of joining strips joining the covers together, said joining strips forming the pouches between one another and between the covers.

Such joining strips are formed in particular by bonding the covers together, e.g. by adhesive or preferably by heat sealing.

When it is desired to allow the framework to be organized on site, the pouches may include respective openings that open out into the margin of the blanket so as to allow at least one tension element to be inserted, or conversely withdrawn. Such an opening is potentially easy to provide with selective closure means so as to enable it to be closed, thereby enabling suction to be established in the pouch. Such closure means may be formed by easily reversible bonding means for use between the covers. Such easily reversible bonding means may be formed, for example, by a slideway zipper, by strips having self-adhesive loops and claws, or indeed by repositionable adhesive, or the like.

The covers may advantageously be made of the same material or of respective materials. For example, one of the covers forms an inside face of the confinement chamber. A cover internal to the blanket may be made of a material that reflects heat and/or may be provided with a specific heat reflecting layer, as formed by a metal foil. Another cover forms an outside face of the confinement chamber, and it may be made of a thermally insulating material and/or it may be provided with a specific thermally insulating layer.

The inside face of the confinement chamber corresponds to a surface of at least one of the large faces of the blanket that is to face towards the zone for treatment when the cap is in the working station. The outside face of the confinement chamber corresponds to a surface of at least one of the large faces of the blanket that is to face towards the outside when the cap is in the working station.

Preferably, the blanket has thermal insulation for one of its large faces defined by the general plane of the blanket. Such thermal insulation forms a heat screen between the confinement chamber and the environment outside the cap, so as to avoid losing the energy delivered by the hot fluid.

In various embodiments taken in isolation or in combination, the thermal insulation may comprise:

at least one flexible layer of flexible insulating material incorporated in any of at least one of the large faces of the blanket. The layer of insulating material may advantageously be formed by the cover constituting the outside face of the blanket, or by a special layer covering the outside face of the blanket. The layer of insulating material may be superposed on and fastened to the corresponding cover that is considered as being the outer cover relative to the outside face of the blanket.

at least one body made of an insulating material and housed inside at least one cell included in the blanket. Advantageously, such a cell is arranged between said two covers at the margin of the pouch. The body may be removably housed inside the cell in order to limit the volume of the blanket when folded or rolled up for transport or stowage. The body may also be fastened to the blanket, in particular by bonding, e.g. with adhesive. By way of example, the body may also be in the form of a granulate housed inside the cell.

at least one closed enclosure arranged between the two said covers and between said joining strips. One of the covers includes vents opening out in one of the large faces of the blanket. The enclosure is in gas-flow communication with said hot fluid blower source, and more particularly with the first gas-flow circuit. Such gas-flow communication may take place via a branch circuit included in the first gas-flow circuit. Such gas-flow communication may also take place via total admission of the hot fluid from the first gas-flow circuit, the admission of hot fluid to the inside of the confinement chamber taking place from the inside volume of the blanket, and more particularly via the cell.

Preferably, the blanket is provided on one of its large faces with a heat reflecting layer. The heat reflecting layer may advantageously be formed by the cover forming the inside face of the blanket, or by a specific layer covering the inside face of the blanket. The heat reflecting layer may be superposed on and fastened to the corresponding cover considered as being the inner cover relative to the inside face of the blanket, e.g. being formed by a metal foil or analogously by a metal plating.

Depending on its shape, the blanket may include at least one skirt extending at least one of its edges. The framework is incorporated in the blanket in a middle zone of the blanket defining the volume of the confinement chamber. The skirt extends said middle zone, closing the confinement chamber around its outlet when the framework is in the active state. The skirt forms a peripheral zone of the blanket suitable for being free of any framework. Depending on requirements, the skirt may easily be provided with a specific framework lying in its general frame.

By way of example, the skirt is incorporated in the blanket, bordering at least one edge of the middle zone.

The skirt is preferably releasably attached to the blanket, being fitted to the margin of the middle zone of the blanket by easily reversible assembly means. Such easily reversible assembly means may be formed by a slideway zipper, strips of self-gripping loops and claws, or indeed by a repositionable adhesive, or the like.

The blanket is optionally provided with easily reversible fastener means arranged at least at its periphery that might correspond to the outlet of the confinement chamber. The fastener means are suitable for providing a leaktight junction between the blanket and the surface to be repaired. Such fastener means with easily reversible bonding may be formed for example by strips of self-gripping loops and claws, one of the strips being attached to the surface that is to be repaired along the outline of the zone for treatment, in particular by means of an adhesive face. The fastener means with easily reversible bonding may for example also be formed by a repositionable adhesive or the like, suitable for being put into place on site by an operator. The blanket may be locally coated on site with repositionable adhesive by an operator in appropriate zones depending on the specific shape of the outlet of the confinement chamber.

In an embodiment, the appliance is suitable for being easily built up from a plurality of modules. The appliance is made up of a plurality of such modules, each formed by a cap. The blankets forming the respective caps of the modules are provided with gas-flow junction means between one another. By way of example, the gas-flow junction means may be formed by ducts and/or valves incorporated in the blanket and provided with means for coupling together the ducts and/or valves included in the respective modules.

Such gas-flow junction means comprise in particular at least first gas-flow junction means through which air flows from one of the pouches included in the blankets forming the respective caps of the modules to another. Such air flow is driven in particular by a force generator source common to the various modules.

The gas-flow junction means may also comprise second gas-flow junction means through which there flows the hot fluid between the modules.

Advantage is taken of the preferably releasable nature of the skirts included in the blankets of the respective modules to put the various confinement chambers of the modules into gas-flow communication with one another for flow of the hot fluid. The caps of two adjacent modules are connected together end to end after removing the corresponding skirts included in the blankets forming the caps, with the confinement chambers included in the respective modules being put into gas-flow communication with one another via the side openings of the caps left free by removing the corresponding skirts.

BRIEF DESCRIPTION OF THE SEVERAL VIEWS OF THE DRAWINGS

Two embodiments of the present invention are described with reference to the figures of the accompanying drawings, in which:

FIG. 1 is a diagrammatic perspective view of an embodiment of an appliance of the present invention;

FIG. 2 is a diagrammatic plan view of an embodiment of a blanket from which a cap of the appliance shown in FIG. 1 is made;

FIG. 3 is a diagrammatic perspective view of a cap included in the appliance shown in FIG. 1, the cap shown being formed from the blanket shown in FIG. 2, and being of a shape different from that shown in FIG. 1;

FIGS. 4 to 6 are fragmentary diagrammatic end edge views of different embodiments of the structure of a blanket as shown in FIG. 2, considered relative to its thickness; and FIG. 7 is a diagrammatic view of an embodiment of an appliance of the present invention having a plurality of caps placed end to end.

DETAILED DESCRIPTION OF THE INVENTION

In FIG. 1, a heater appliance is for repairing a surface made of organic polymer material. The appliance comprises a cap 1 that defines a confinement chamber 2 for confining a zone for treatment of the surface to be repaired. The cap 1 is in gas-flow communication with a blower source 3 of a hot fluid for heating the zone for treatment. The hot fluid is admitted into the inside of the confinement chamber 2 via a first gas-flow circuit 4.

The cap 1 defines the confinement chamber 2, leaving an outlet 5 of the confinement chamber 2 that is to surround the zone for treatment. The outlet 5 is defined by a free edge of the cap 2, said free edge defining an opening to the outside of the confinement chamber 2. In order to ensure that the cap 1 is in leaktight connection on the surface to be repaired, the cap 1 is deformable so that the outlet 5 of the confinement chamber 2 is suitable for matching the shape of the outline of the zone for treatment. The deformability of the cap 1 allows the outlet 5 of the confinement chamber 2 to deform spontaneously along the outline of the zone for treatment, as a function of variations in the portions in relief of the surface to be repaired.

In FIGS. 1, 2, and 3, the deformability of the cap 1 is optimized not only for ensuring that the outlet 5 of the confinement chamber 2 spontaneously shapes itself around the zone for treatment, but also to cause the cap 1 to pass between a resting station and a working station. In the resting station of the cap 1, as shown in FIG. 2, the cap 1 is in a generally plane and flexible shape in its natural state. In the working station, as shown in FIG. 1, the cap 1 defines a confinement chamber 2 suitable for being placed over a zone for treatment.

The cap 1 is made up of a blanket 6 incorporating a framework 7 in its general plane for the purpose of shaping the blanket 6 in the working station of the cap 1. The framework 7 extends in the general plane of the blanket 6, being made up of tension elements 8, 8' extending individually in one of the directions D1 and D2 in which the blanket 6 extends in its general plane P.

In the resting station shown in FIG. 2, the cap extends in a plane corresponding to the general plane of the blanket 6. The framework 7 extends generally through the blanket 6 in the two directions D1 and D2 that define the general plane of the blanket 6.

In FIG. 1, the framework 7 is made up of one or more tension elements 8 obtained from a strip of felt, and is in gas-flow communication with a suction source 9 via a second gas-flow circuit 10. Putting the tension elements 8 under suction causes the felt strip from which the tension elements 8 are made to be compacted, thereby having the effect of progressively stiffening the framework 7. The blanket 6 has a valve 11 for connection to the suction source 9, and more particularly to the second gas-flow circuit 10. The valve 11 enables the suction source 9 to be put into gas-flow communication with at least one pouch included in the blanket 6 and housing the framework 7.

The inside volume of the confinement chamber 2 does not have any gas-flow member, in particular it does not have any duct, involved in one and/or the other of the first gas-flow circuit 4 and the second gas-flow circuit 10.

In the embodiments shown respectively in FIG. 1 and in FIG. 3, the confinement chamber 2 formed by deforming the blanket 6 in its general plane is arranged as a tunnel of generally semi-cylindrical shape. The framework 7 has a plurality of tension elements 8, 8', including at least one main tension element 8 and at least one secondary tension element 8'.

More specifically, a main tension element 8 extends along a generator line of the tunnel. The secondary tension elements 8' extend transversely, in particular perpendicularly, relative to the main tension element 8, extending along respective arcs of the tunnel. Depending on the shape to be obtained for the confinement chamber 2, the shape of the framework 7 is organized by being made up of various tension elements 8, 8' that are specifically arranged to extend in the general plane P of the blanket 6, as shown in FIG. 2 for the resting station of the cap 1.

The blanket 6 and the framework 7 that it incorporates are flexible and deformable in the natural state. The framework 7 is suitable for being stiffened progressively in order to apply tensions locally to the blanket 6 in its general plane P. The tensions are applied locally by the framework 7 on the blanket 6 via the tension elements 8, 8' making up the framework 7. Said localized tensions cause the blanket 6 to deform in crumpling in its general plane P in order to form the confinement chamber 2 and in order to keep it in shape.

In FIG. 2, the blanket 6 has a middle zone 12 within which the framework 7 is incorporated. The middle zone 12 is bordered by at least one skirt 13, 13' forming part of the blanket 6. The skirt(s) 13, 13' extend(s) the middle zone 12 when the cap 1 is in its working station. In the embodiment shown, the skirts 13, 13' are removably assembled to the middle zone 12 via easily releasable assembly means 14. The removable nature of the skirts 13, 13' allows them to be withdrawn from the middle zone 12, so as to enable them to be used in selective manner depending on the shape the confinement chamber 2 is to obtain and in order to make the blanket 6 easier to fabricate.

The blanket 6 is optionally provided with fastener means 15 for fastening the cap 1 on the surface to be repaired. By way of example, the fastener means 15 may be constituted by co-operating hook-and-loop strips arranged on the margins of the blanket 6, such as at the margin of its middle zone 12, or indeed at the margin(s) of the skirt(s) 13, 13' extending it. In an advantageous embodiment, the inside face of the blanket 6 that should be considered as being intended to come into contact with the surface to be repaired is coated in a repositionable adhesive, locally by an on-site operator.

Using a repositionable adhesive or the like provides freedom in shaping the cap 1 and in fastening the blanket 6 along the outline of the zone for treatment, without prejudice to the shape of that outline. While using the same blanket 6 and avoiding damage to the surface to be repaired by the fastener means 15, it is possible to implement caps 1 of a variety of shapes.

For example, the caps 1 shown respectively in FIGS. 1 and 3 are each formed individually from the same blanket 6 having the same framework 7, and in particular the blanket 6 and the framework 7 shown in FIG. 2.

As shown more particularly in FIG. 3, progressively applying suction to the framework 7 makes it possible in an intermediate state of stiffening of the framework 7 to take advantage of a malleable nature that the framework 7 takes up in order to facilitate shaping the cap 1, and more particularly the confinement chamber 2, to match the shape of the outline of the zone for treatment. In the intermediate state, the operator can bend the framework 7, and in particular can bend the individual tension elements 8, 8' making it up, so as to match the shape of the confinement chamber 2 and of its outlet as closely as possible to the shape of the outline of the surface to be treated.

In FIGS. 4 to 6, the blanket 6 is made up of two covers 16 and 17 that are superposed one on the other in their general plane and sealed together. Joining strips 18 define one or more pouches 19 by sealing the covers 16, 17 together. The pouch 19 is for housing the framework 7, and more particularly for individually housing one of the tension elements making it up.

The blanket 6 is provided with thermal insulation 21 and with a heat reflecting layer 20. The thermal insulation 21 serves to avoid losing energy between the confinement chamber that receives the hot fluid and the surroundings outside the cap. The heat reflecting layer 20 is arranged on the inside face of the blanket 6 that is to face towards the zone for treatment when the cap is in its working station.

The heat reflecting layer 20 may constitute one of the covers, as in the embodiments shown, and in particular the inner cover 17 of the blanket 6. By analogy, the heat reflecting layer 20 may also be carried by such an inner cover 17, fastened thereto so that they are superposed in its general plane, in particular by sealing means.

In FIG. 4, the thermal insulation 21 is constituted by a flexible layer made of an insulating material. The layer of insulating material 22 may form one of the covers, and in particular an outer cover 16 of the blanket 6, as in the embodiment shown. The layer of insulating material 22 may also, by analogy, be carried by such an outer cover 16, being fastened thereto so that they are superposed in its general plane, in particular by sealing.

In FIG. 5, the thermal insulation 21 is made from a body 23 of insulating material that is housed within cells 24 located within the thickness of the blanket 6. Such cells 24 are advantageously arranged between the covers 16 and 17 at the margins of the pouches 19, as defined by the joining strips 18. The cells 24 may be open at the margin of the blanket 6 so as to allow bodies 23 to be inserted and/or conversely withdrawn by an operator.

In FIG. 6, the thermal insulation 21 is made up of one or more closed enclosures 25 that are provided between the covers 16 and 17. The joining strips 18 between the sheets 16 and 17 are used for defining not only the pouches 19, but also such enclosures 25. One of the covers, and more particularly the inner cover 17, includes vents 26 for providing gas-flow communication between the inside volume of the blanket 6 as defined between the covers 16 and 17 and the outside surroundings.

The enclosure 25 is in gas-flow communication with the first gas-flow circuit 4 for establishing a fluid flow connection between the blanket 6 and the hot fluid blower source 3. Delivering the hot fluid to the inside of the confinement chamber while the cap is in its working position is advantageously performed via the enclosure 25. The enclosure 25 not only provides thermal insulation 21, but also a channel for feeding the hot fluid from the first gas-flow circuit 4 to the inside of the confinement chamber.

In FIG. 7, the appliance comprises a plurality of modules 27, 28, each comprising a cap 1. Each of the caps 1 of the respective modules 27 and 28 comprises a blanket having a framework incorporated therein. In the embodiment shown, the caps 1 have analogous respective shapes. Nevertheless, it is possible, advantageously, to make use of modules 27 and 28 in which the respective caps 1 define confinement chambers of mutually different shapes from one of the caps 1 to the other. Use is made of the specific ability of the confinement chambers of each of the caps 1 to be shaped in order to provide an overall confinement chamber of complex shape and/or of considerable size.

The caps 1 are connected together end to end. The blankets from which the caps 1 are respectively formed are fitted with means for providing gas-flow junctions between the caps 1.

First gas-flow junction means 29 enable communications to be established between the pouches 19 of the respective blankets. A suction source 9 common to both of the caps 1 enables both of the frameworks included in the respective caps 1 to be stiffened. The pouch 19 in one of the caps 1 is in fluid flow communication with the second gas-flow circuit 10 and with the pouch 19 of the other cap 1 via first gas-flow junction means 29. The connection valve 11 of each of the blankets may be used for forming the first gas-flow junction means 29.

Second gas-flow junction means enable the confinement chambers 2 formed by respective ones of the caps 1 to be into communication with each other. The adjacent removable skirts of each of the blankets are removed so as to allow hot fluid to flow freely from one of the caps 1 to the other, by using a hot air blower source 3 in common for both modules 27 and 28.

The free flow of hot fluid from one of the caps 1 to the other takes place through respective side openings 30 of the caps 1 that are of considerable dimensions. Said side openings 30 are normally closed by the corresponding skirts before they were removed. The extent of a side opening 30 corresponds in particular to the extent of the caps 1 in the zone where they are connected together end to end, the side openings 30 of the caps 1 advantageously forming second gas-flow junction means. The easily releasable means for assembling the skirts to the middle zones of the blanket respectively allocated thereto are made use of for obtaining leaktight end-to-end connections between the caps 1 of the modules 27 and 28.

What is claimed is:

1. An appliance for localized heating of a polymer material surface to be repaired by blowing a hot fluid inside a confinement chamber for confining a zone for treatment, the appliance comprising at least one deformable cap forming the confinement chamber and providing at least one outlet from the confinement chamber towards the outside of the cap, the cap being in gas-flow communication with a blower source for blowing a raised temperature fluid, the cap being deformable between two stations, including a natural resting station in which the cap occupies a spontaneous shape and a working station in which the cap defines the volume of the confinement chamber by being placed under stress by selectively using force generator means included in the appliance, wherein the cap is constituted by a generally plane blanket incorporating a framework in its general plane for shaping the confinement chamber under the effect of tensions applied locally by the framework on the blanket in its general plane, the framework being suitable for changing shape between a passive state in which the blanket and the framework that it includes are spontaneously plane, and an active state in which the framework is subjected to deformation by said force generator means and applies localized tensions to the blanket.

2. An appliance according to claim 1, wherein the framework is flexible in the passive state and is stiffened in the active state by the force generator means that induce a change of state in the framework between its passive state and its active state.

3. An appliance according to claim 2, wherein the force generator means induce a progressive change to the state of the framework between the passive state and an optimum active state in which the framework is rigid, the framework being malleable in an intermediate state between the passive state and the optimum active state.

4. An appliance according to claim 1, wherein the framework is housed inside at least one closed pouch formed in the blanket, and is made up of at least one tension element made of a body of cellular material having intercommunicating open cells, the force generator means being for generating suction inside the pouch.

5. An appliance according to claim 4, wherein the tension element is made from a strip of felt having fibers that form said cells between them.

6. An appliance according to claim 4, wherein the framework is made up of a plurality of co-operating elongate tension elements, each extending across the blanket between at least two opposite edges thereof.

7. An appliance according to claim 4, wherein the blanket is made up of at least two covers superposed in their general plane and fastened together by means of joining strips forming the pouches between one another and the covers.

8. An appliance according to claim 7, wherein the blanket has thermal insulation for one of its large faces defined by the general plane of the blanket.

9. An appliance according to claim 8, wherein the thermal insulation comprises at least one flexible layer of flexible insulating material incorporated in any of at least one of the large faces of the blanket.

10. An appliance according to claim 8, wherein the thermal insulation comprises at least a body made of an insulating material and housed inside at least one cell included in the blanket.

11. An appliance according to claim 10, wherein the cell is arranged between said two covers at the margin of the pouch.

12. An appliance according to claim 1, wherein the blanket is provided on one of its large faces with a heat reflecting layer.

13. An appliance according to claim 1, wherein the blanket includes at least one skirt for extending at least one of its edges, the blanket incorporating the framework in a middle zone defining the volume of the confinement chamber, the skirt extending said middle zone and closing the confinement chamber around its outlet when the framework is in its active state.

14. An appliance according to claim 1, wherein the blanket is provided with releasable fastener means arranged at least at the outlet of the confinement chamber, the fastener means being suitable for providing a leak tight junction between the blanket and the surface to be repaired.

15. An appliance according to claim 1, wherein the appliance is made up of a plurality of modules each formed by a cap, the blankets forming the respective caps of the modules being provided with gas-flow junction means between one another.

16. An appliance according to claim 15, wherein the gas-flow junction means comprise at least first gas-flow junction means through which air flows between pouches included in the blankets forming the respective caps of the modules.

17. An appliance for localized heating of a polymer material surface to be repaired by blowing a hot fluid inside a confinement chamber for confining a zone for treatment, the appliance comprising:
  a blower for blowing a raised temperature fluid;
  a force generator; and
  at least one deformable cap forming the confinement chamber and providing at least one outlet from the confinement chamber towards the outside of the cap, the cap being in fluid communication with the blower, the cap being deformable between two stations, including a resting station in which the cap occupies a natural shape and a working station in which the cap defines the volume of the confinement chamber by being placed under stress by selectively using the force generator, wherein the cap includes:
    a generally plane blanket made up of at least two covers superposed in their general plane and fastened together by means of joining strips forming pouches between one another and the covers, the blanket having thermal insulation for one of its large faces defined by the general plane of the blanket, the thermal insulation comprising at least one closed enclosure arranged between the two covers and between the joining strips, one of the covers including vents opening out in one of the large faces of the blanket, the enclosure being in fluid communication with the blower; and
    a framework incorporated in the general plane of the blanket for shaping the confinement chamber under the effect of tensions applied locally by the framework on the blanket in its general plane, the framework being configured to change shape between a passive state and an active state, wherein in the passive state the blanket and the framework that it includes are generally planar, and an active state in which the framework is subjected to deformation by the force generator and applies localized tensions to the blanket.

18. An apparatus for providing heated fluid from a blower to a polymer surface, the apparatus comprising:
  a flexible blanket defining a pocket cooperable with the blower, the blanket expandable between a collapsed position and an expanded position, wherein in the collapsed position the blanket is generally planar and the pocket has a first volume and in the expanded position the pocket has a second volume, the second volume being greater than the first volume;
  a framework associated with the blanket and transitionable between a passive state and an active state, wherein transitioning the framework from the passive state to the active state expands the blanket from the collapsed position to the expanded position, in the passive state the framework is flexible and generally planar, and in the active state the framework is rigid and applies tension to the blanket; and
  a force generator configured to selectively transition the framework between the active state and the passive state.

19. The apparatus of claim 18, wherein the flexible blanket includes a closed pouch housing the framework, the pouch being in fluid communication with the force generator and being fluidly separate from the pocket, the force generator is configured to selectively generate suction within the pouch, and the framework is configured to transition from the passive state to the active state in response to suction within the pouch.

20. The apparatus of claim 18, wherein the blanket is additionally expandable to an intermediate position and the framework is additionally transitionable to an intermediate state, wherein in the intermediate position the pocket defines a third volume, the third volume being greater than the first volume, and in the intermediate state the framework is malleable and the blanket is in the intermediate position.

* * * * *